United States Patent
Zhu et al.

(10) Patent No.: US 9,875,460 B2
(45) Date of Patent: Jan. 23, 2018

(54) REMOVABLY SUSTENDED ELECTRONICALLY ADDRESSABLE OBJECT AND SYSTEM

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: ZMICRODATA CORPORATION, San Jose, CA (US)

( * ) Notice: Subject to any disclaimer, the term of this patent is extended or adjusted under 35 U.S.C. 154(b) by 54 days.

(21) Appl. No.: 14/999,010

(22) Filed: Mar. 17, 2016

(65) Prior Publication Data

US 2017/0270469 A1  Sep. 21, 2017

(51) Int. Cl.
*E05B 35/00* (2006.01)
*G06Q 10/08* (2012.01)
(Continued)

(52) U.S. Cl.
CPC ........... *G06Q 10/087* (2013.01); *E05B 17/10* (2013.01); *G08B 13/149* (2013.01);
(Continued)

(58) Field of Classification Search
CPC .. G06K 19/00; G06K 19/00896; G06K 19/06; G06K 19/067; G06K 19/07;
(Continued)

(56) References Cited

U.S. PATENT DOCUMENTS 6,131,808 A * 10/2000 Pires ..................... G06K 17/00
235/375
6,205,138 B1 * 3/2001 Nihal .................... H04L 49/101
333/1
(Continued)

*Primary Examiner* — Benyam Haile

(57) ABSTRACT

An electronically addressable object carrier for enabling the management of removably suspended objects, such as keys, distributed in an object location space, The object carrier includes a housing having an object retention element for securing an object to the object carrier and at least one through aperture for removably receiving an electrically conductive suspension member capable of manifesting object address signals and power signals supplied by a source; a microcontroller carried by the housing, the microcontroller having a unique object address serving to identify an object secured to the object carrier; an electrically conductive element located in the at least one aperture for electrically coupling the microcontroller to the electrically conductive suspension member when the aperture is removably received on the electrically conductive suspension member; and a visible indicator coupled to the microcontroller for activation whenever the microcontroller receives an address signal representative of the unique object address. Two electrically conductive elements can be used: one having first and second electrically conductive members slidably and oppositely disposed in a single aperture and bias means for urging the first and second electrically conductive members toward each other to make contact with an electrically conductive suspension member when the carrier is mounted. Another being a pair of washers mounted in spaced first and second apertures in the housing. In use, (Continued)

the devices are removably suspended by one or two electrically conductive suspension members secured to a support element, such as the back board of a cabinet.

18 Claims, 8 Drawing Sheets

(51) Int. Cl.
| | |
|---|---|
| H05B 33/08 | (2006.01) |
| G08B 13/14 | (2006.01) |
| E05B 17/10 | (2006.01) |
| E05B 19/00 | (2006.01) |
| G09F 3/00 | (2006.01) |
| G06K 17/00 | (2006.01) |
| G06K 19/077 | (2006.01) |
| G08B 5/22 | (2006.01) |
| G06K 19/067 | (2006.01) |
| G07C 9/00 | (2006.01) |
| G06K 19/06 | (2006.01) |
| G06K 19/00 | (2006.01) |
| G06K 19/07 | (2006.01) |

(52) U.S. Cl.
CPC .......... *H05B 33/0842* (2013.01); *E05B 19/00* (2013.01); *E05B 19/0005* (2013.01); *E05B 35/00* (2013.01); *G06K 19/00* (2013.01); *G06K 19/06* (2013.01); *G06K 19/067* (2013.01); *G06K 19/07* (2013.01); *G06K 19/077* (2013.01); *G06K 19/07743* (2013.01); *G06K 19/07745* (2013.01); *G06K 2017/0045* (2013.01); *G06K 2017/0051* (2013.01); *G07C 9/00896* (2013.01); *G07C 2009/00936* (2013.01); *G08B 5/22* (2013.01); *G09F 3/00* (2013.01)

(58) Field of Classification Search
CPC ....... G06K 19/07743; G06K 19/07745; G06K 19/077; G06K 2017/0045; G06K 2017/0051; G07C 2009/00936; E05B 19/0005; E05B 17/10; G09B 19/00; G09F 3/00; G06Q 10/087; G08B 5/22; G08B 13/2482
See application file for complete search history.

(56) References Cited

U.S. PATENT DOCUMENTS

2010/0049635 A1\* 2/2010 Delaney ............... G06Q 10/087
  705/28
2011/0079652 A1\* 4/2011 Bass ...................... E05B 19/00
  235/492

\* cited by examiner

REMOVABLY SUSTENDED ELECTRONICALLY ADDRESSABLE OBJECT AND SYSTEM

BACKGROUND OF THE INVENTION

This invention relates to collective objects management systems in general, and in particular to an improved collective objects management system using object identification with digital addresses. More particularly, this invention relates to an improvement for a collective objects management system using object identification with digital addresses, the improvement pertaining to removably suspended objects.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed and inventoried, some type of file management system is necessary.

Commonly assigned U.S. Pat. No. 8,471,717 issued Jun. 25, 2013 for "Collective Objects Management System With Object Identification Using Addressable Decoder Units" discloses a system for managing objects distributed in an object location space. The disclosure of the '717 patent is hereby incorporated by reference. The '717 system comprises a container, such as a file drawer, having a plurality of mutually electrically isolated electrically conductive paths, at least one of which can receive address signals supplied by a source and specifying a sought object; and a plurality of object receptacles positioned in the container, each of the plurality of object receptacles having (a) a plurality of electrically conductive members, each of which is electrically coupled to a different one of the plurality of mutually electrically isolated electrically conductive paths;

(b) an address decoder circuit associated to an object in the receptacle, the address decoder circuit having a unique system address, the address decoder circuit further having a plurality of electrically conductive terminals in electrical contact with the plurality of electrically conductive members; and (c) an indicator, such as a visible indicator (e.g., an LED) coupled to the address decoder circuit for activation whenever the address decoder circuit detects an address signal present on at least one of the plurality of electrically conductive members and representative of the unique system address of the object in the receptacle.

The '717 system further includes a source comprising an encoder for generating the address signals, the encoder having at least one input terminal for receiving object identification signals from a supply device, at least one output terminal coupled to each address decoder circuit of the plurality of object receptacles, and circuitry for generating a signal representative of the unique system address of the object specified by the object identification signals.

In a specific embodiment, the container comprises a file folder drawer; and each object receptacle comprises a file folder having a pair of support braces, with one of the support braces containing the plurality of electrically conductive members. In this embodiment, the address decoder circuit and the indicator of each of the object receptacles are carried by one of the two support braces of each file folder.

The file folder drawer has a front panel with an additional indicator mounted thereon; and the system further includes circuitry for operating the additional indicator whenever an address decoder circuit located in the file folder drawer detects an address signal present on the at least one of the plurality of electrically conductive members and representative of the unique system address of that address decoder.

Each address decoder circuit includes circuitry for generating a VALID signal whenever that address decoder circuit detects an address signal present on the at least one of the plurality of electrically conductive members and representative of the unique system address of that address decoder circuit.

A cabinet microcontroller supplies power signals to the plurality of object receptacles via some of the electrically conductive paths, and address signals via the at least one of the electrically conductive paths; and receives VALID signals generated by each address decoder circuit when an incoming address matches a given address decoder circuit system address. The microcontroller also includes circuitry for generating information signals identifying the location in the system of any address decoder circuit which generates a VALID signal.

The '717 technique provides objects management capability for objects distributed in an object location space which is superior to older, manual techniques implemented in the past.

A unique class of collective objects is comprised of those objects designed to be removably suspended for storage, access and display purposes. One example of this class of collective objects is a collection of keys each provided with a key holder which can be removably attached to a suspension device, such as a hook or a peg. Several key holders and keys are usually removably stored in one or more key cabinets, depending on the number of keys in the collection. Each key or key holder is normally provided with a label containing information identifying the associated key and its application. Another example of this class of collective objects is a collection of mechantable items (such as dry cell batteries, hardware items, or the like) carried by a packaging unit designed to be removably attached to a suspension device and provided with identifying information for the item. The key holders and packaging units are typically provided with a through aperture for enabling removable mounting on the suspension device. While this class of collective objects could benefit from the advantages afforded by the electronically addressable collective objects management system described above with reference to the '717 patent, to date there has been no commercially available implementation of the principles of the electronically addressable collective objects management system to the class of removably suspendable objects.

SUMMARY OF THE INVENTION

The invention comprises an electronically addressable removably suspendable object carrier and a system for management of objects carried thereby.

In a device aspect, the invention comprises an electronically addressable object carrier for enabling the management of objects distributed in an object location space, the object carrier comprising a housing having an object retention element for securing an object to the object carrier and at least one through aperture for removably receiving an electrically conductive suspension member capable of manifesting object address signals and power signals supplied by a source; a microcontroller carried by the housing, the microcontroller having a unique object address serving to identify an object secured to the object carrier; an electrically conductive element located in the at least one aperture for electrically coupling the microcontroller to the electrically conductive suspension member when the aperture is removably received on the electrically conductive suspension member; and an indicator coupled to the microcontroller for activation whenever the microcontroller receives an address signal representative of the unique object address. The indicator is a visible indicator, preferably an LED light source.

In one embodiment the housing has a single through aperture, and the electrically conductive element comprises first and second electrically conductive members slidably and oppositely disposed in the at least one aperture and bias means for urging the first and second electrically conductive members toward each other so that the first and second electrically conductive members are urged into ohmic contact with an electrically conductive suspension member when the aperture is removably received on the electrically conductive suspension member. In this embodiment, the bias means preferably comprises a pair of springs each engaged with a different one of the first and second electrically conductive members. This embodiment is intended for use with a suspension member having two electrically conductive portions separated by an electrically non-conductive central portion. One such suspension member has substantially cylindrical geometry; another has substantially rectangular geometry.

In another embodiment the housing has first and second mutually spaced through apertures for removably receiving first and second electrically conductive suspension members, at least one of the first and second electrically conductive suspension members being capable of manifesting object address signals and power signals supplied by a source. In this embodiment each of the first and second apertures is provided with an electrically conductive element located therein for electrically coupling the microcontroller to the first and second electrically conductive suspension members when the first and second mutually spaced apertures are removably received on the first and second electrically conductive suspension members. The electrically conductive element preferably comprises a serrated washer.

The object retention element preferably includes an additional through aperture formed in the housing so that an object can be attached to the housing.

The device according to the invention may also include an additional indicator coupled to the microcontroller for activation whenever the microcontroller receives power signals.

In use, the devices according to the invention are removably suspended by a plurality of electrically conductive suspension members capable of manifesting object address signals and power signals supplied by a source, the suspension members being secured to a support element, such as the back board of a cabinet.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of electronically addressable removably suspendable objects. The following is a detailed description of one application of the invention to removably suspended objects which are keys attached to object carriers which are key holders.

Figure 1:
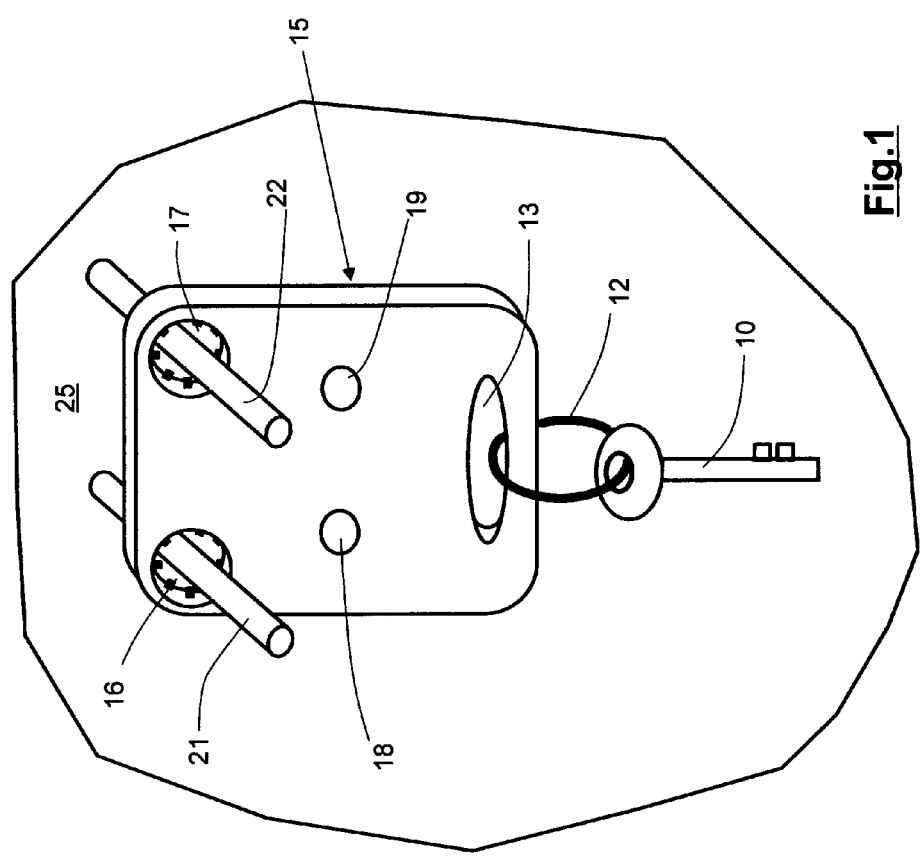
FIG. 1 is a perspective view of a first embodiment of a removably suspended object in the form of a key and a key holder object carrier removably suspended on two suspension members.

Turning now to the drawings, FIG. 1 is a perspective view of a first embodiment of a removably suspended object in the form of a key and an object carrier in the form of a key holder removably suspended on two suspension members. As seen in this Fig., a key 10 is secured by a key ring 12 to a key holder generally designated with reference numeral 15. Key ring 12 is received in a through-aperture 13 formed in the lower region of key holder 15. Key holder 15 is provided with two through-apertures 16, 17 in the upper region thereof so that key holder 15 can be removably suspended by two electrically conductive suspension members 21, 22 secured to a backboard 25.

Once installed, key 10 should permanently remain attached to key holder 15. To reduce or eliminate entirely the removal of a key 10 from its associated key holder 15, key ring 12 should preferably be sealed in such a manner that (a)

the key 10 cannot be removed from the key ring 12; and (b) the key ring 12 cannot be removed from the key holder 15. This can be done in several different ways, depending on the material from which the key ring 12 is fabricated. If key ring 12 is fabricated from spring steel, adjacent windings of key ring 12 can be welded together, or bonded together with an epoxy material. If key ring 12 is fabricated from a tough plastic material, adjacent windings of key ring 12 can be fused together by ultrasonic welding, or bonded together using a suitable epoxy or other adhesive material that cures to a durable state. Other such techniques will occur to those of ordinary skill in the art.

Suspension members 21, 22 may be straight rods as illustrated, or may comprise hooks with upturned outer ends to promote retention of key holder 15 on the suspension members. Suspension members 21, 22 are formed to a diameter dimension which is conformable with the inner diameters of key holder through-apertures 16, 17. Suspension members 21, 22 are fabricated from an electrically conductive material for a purpose described below.

The facing surface of key holder 15 is further provided with two apertures 18, 19 which are dimensioned to accommodate a pair of visible indicators, such as LED light sources, described below.

Figure 2:
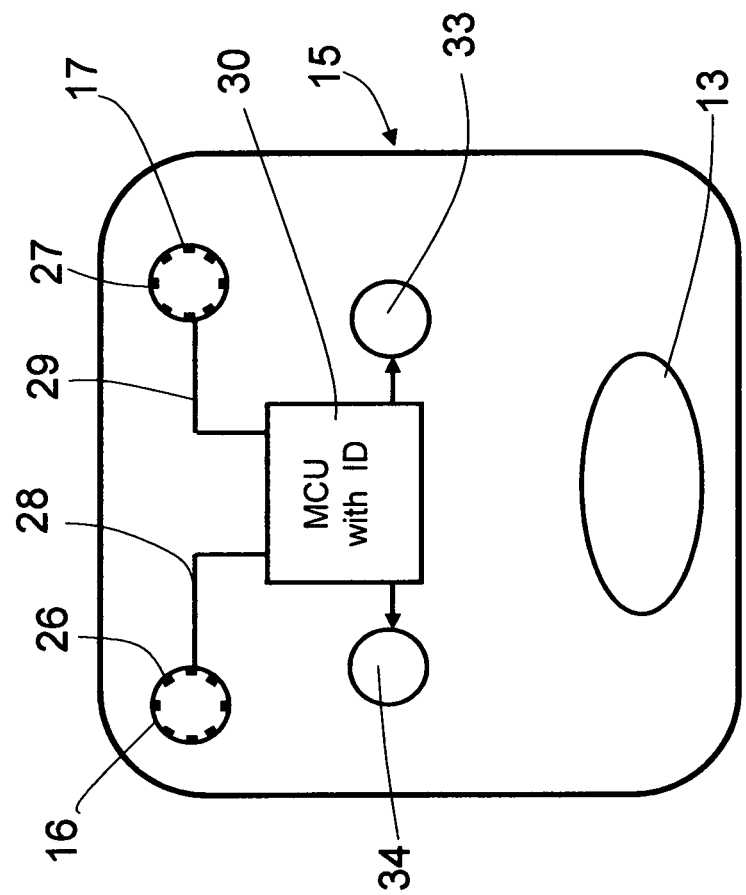
FIG. 2 is a schematic front plan view of the key holder object carrier of FIG. 1 illustrating the principal components of the key holder.

With reference to FIG. 2, a pair of electrically conductive contact elements 26, 27 are secured, respectively, in through-apertures 16, 17 of key holder 15. Contact elements 26, 27 preferably comprise conventional serrated electrically conductive steel washers, each of which is ohmically connected by means of ohmically conductive paths 28, 29 to a different input port of an object carrier microcontroller unit (MCU) 30. MCU 30 is preferably a type PIC 10F202 device available from Microchip Technology, Inc. of Chandler, Ariz. and incorporates a memory unit which stores a unique identification character serving to identify the key holder 15 in which it is located. Object carrier microcontroller 30 is ohmically connected to suspension members 21, 22 via conductive paths 28, 29 and contact elements 26, 27 whenever key holder 15 is removably suspended on suspension members 21, 22. MCU 30 also has two output ports which are individually connected to a power on visible indicator 33 and an address match visible indicator LED 34. Power on visible indicator 33 is activated whenever current flows from MCU 30, which occurs whenever MCU 30 is ohmically connected to suspension members 21, 22 via conductive paths 28, 29 and contact elements 26, 27, and electrical power is present on suspension members 21, 22. Address match visible indicator 34 is activated by object carrier microcontroller 30 whenever an address signal matching the identification of key holder 15 is presented to object carrier microcontroller 30 from suspension members 21, 22. Visible indicators 33, 34 may comprise any one of a number of known elements capable of providing a visible signal when activated in the manner described below. Examples of suitable indicators are a conventional LED indicator, and a type 276-036 flashing LED indicator available from Radio Shack Corporation. To avoid confusion, visible indicators 33, 34 preferably emit light of different colors, such as red for power on visible indicator 33 and green for address match visible indicator 34.

Figure 3:
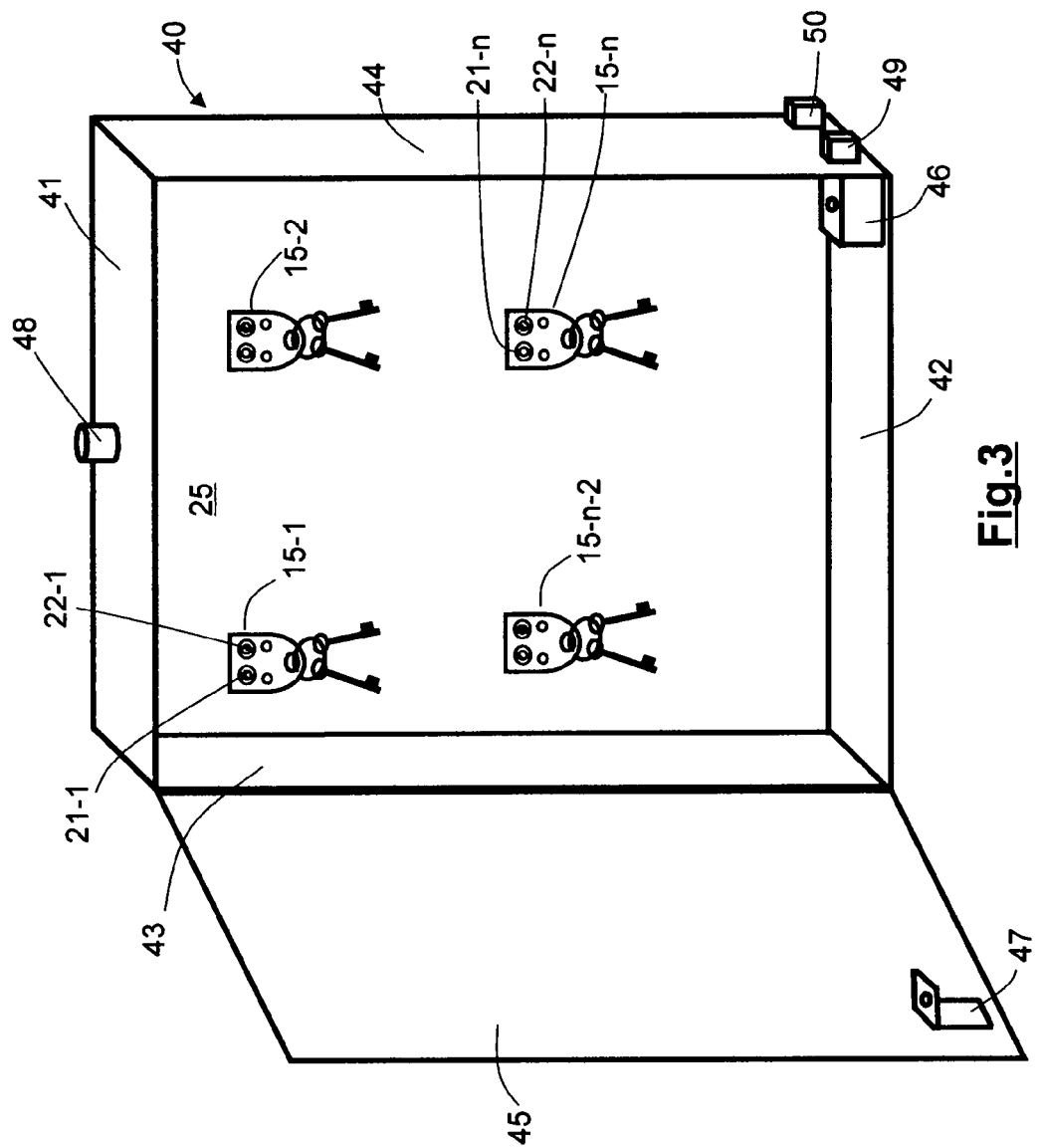
FIG. 3 is a perspective view of a cabinet for removably storing several removably suspended objects of the type shown in FIG. 1.

FIG. 3 is a perspective view of a cabinet for removably storing several removably suspended objects of the type shown in FIG. 1. As seen in this Fig., a cabinet generally designated with reference numeral 40 has a back wall 25, a top wall 41, a bottom wall 42, a left side wall 43, a right side wall 44 and a hinged door 45. Door 45 may be fabricated from a transparent material, such a transparent plastic or tempered glass so that the interior contents are visible from outside the cabinet 40 when door 45 is closed. A conventional electrically operable lock mechanism 46 is attached to the interior of cabinet 45 and a catch 47 operable with lock mechanism 46 is secured to door 45. A plurality of pairs of suspension members 21-1, 22-1, . . . , 21-n, 22-n is secured to back wall 25 for removably suspending a plurality of key holders 15-1, . . . , 15-n in the interior of cabinet 40. Cabinet 40 has a cabinet visible indicator 48 mounted in a prominent location, such as on top wall 41. Cabinet visible indicator 48 is activated whenever a sought key holder 15-i is located within that cabinet 40. A pair of address signal and power connectors 49, 50 is mounted to cabinet 40 in a convenient location, such as the bottom portion of right side wall 44. Connectors 49, 50 are preferably conventional USB connectors. One of the connectors, such as connector 49, provides communication capability between cabinet 40 and a cabinet controller described below; the other connector, such as connector 50, provides communication capability between cabinet 40 and another cabinet (when 2 or more cabinets are deployed in a system).

Figure 4:
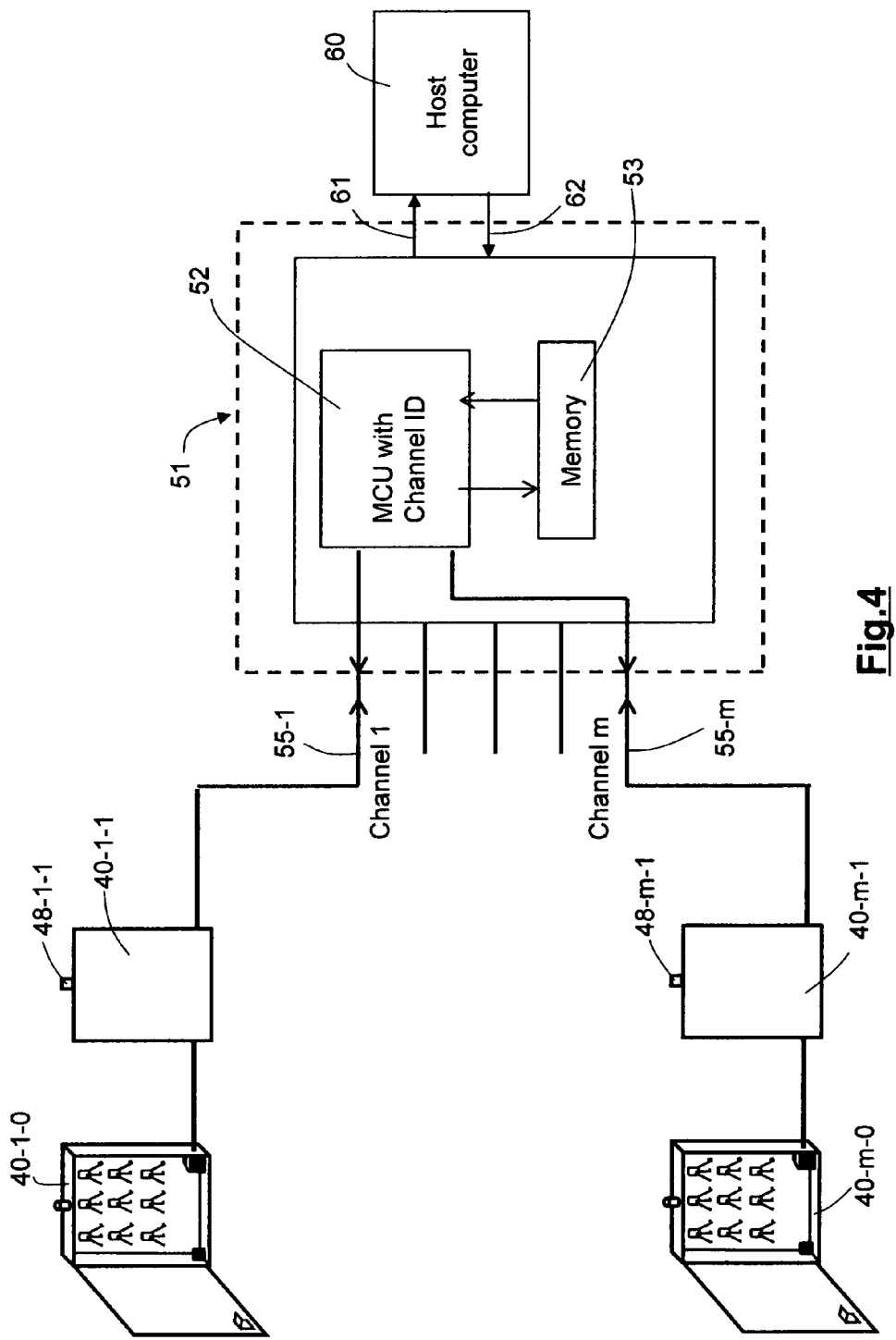
FIG. 4 is a schematic block diagram showing the principal system components in a collective objects management system using the removably suspended objects according to the invention.

As already noted, cabinet 40 is connected to a cabinet controller generally designated with reference numeral 51 and shown in FIG. 4 within the dotted rectangular outline. As seen in this Fig., cabinet controller 51 includes a microcontroller unit (MCU) 52, and a memory unit 53. MCU 52 is preferably a type LPC1766 device available from NXP Semiconductor Corporation of Eindhoven, The Netherlands. Memory unit 53 may be any memory device which is compatible with MCU 52 and has sufficient capacity to store key holder information for the maximum number of key holders 15-i which can be accommodated by a maximum number o of cabinets 40-i. Cabinet controller microcontroller unit 52 is configured to communicate with a host computer 60 either via hard wired conductors 61, 62 or via a wireless communication link. Cabinet controller microcontroller unit 52 communicates with individual key holders 15-i in individual cabinets 40 via channel communication links 55-1, . . . , 55m, where m is the maximum number of channels MCU 52 is capable of independently controlling. Each channel 55-i is connected between MCU 52 and the first cabinet 40-i-1 in a cascaded collection of cabinets via the input connector 49 of the first cabinet 40-i-1 in the series. The first cabinet 40-i-1 in the series is connected to the next cabinet 40-i-2 via the output connector 50 of the first cabinet to the input connector 49 of the second cabinet, etc.

Cabinet controller microcontroller unit 52 can respond to information requests from host computer 60 in several ways. For example, host computer 60 may send a request to microcontroller unit 52 to locate a specific key holder 15. Upon receipt of such a request, microcontroller unit 52 generates the address signals for that specific key holder 15 and places these signals on all channels 55-i of the system. These address signals are coupled to all of the suspension members 21, 22 in all of the cabinets 40-i configured in the system. If the key holder 15 specified by the address signals is present in a cabinet 40-i, microcontroller unit 52 will receive a key holder found signal from the key holder MCU 30 having the matching address. Also, the key holder MCU 30 having the matching address will activate its address match visible indicator LED 34. Upon receipt of the key holder found signal, microcontroller unit 52 activates the visible indicator device 48 of that cabinet via the channel to which the cabinet containing the found key holder 15 is connected, activates the cabinet door lock 46 to unlock the cabinet door 45, and sends an information signal to host computer 60 indicating that the specified key holder 15 has been located and indicating the identity of the cabinet 40 in which the found key holder 15 is located. Activation of the cabinet visible indicator device 48 by microcontroller unit 52 enables a human operator to quickly locate the cabinet containing the sought key, while activation of the address match visible indicator LED 34 by the key holder MCU 30 pinpoints the location of the sought key in the cabinet.

If microcontroller unit 52 does not receive a key holder found signal, an information signal is sent to host computer 60 indicating that the specified key holder was not located. In response, host computer 60 can update the master system data base to reflect this information.

Host computer 60 may send a request for an update of the object identification contents of the cabinet(s) to which microcontroller 52 is connected. In response to such a request, microcontroller unit 52 reads this information from memory device 53 and send this information to host computer 60. In this way, the master system data base can be quickly updated on a periodic or random basis.

Microcontroller unit 52 is also configured to perform periodic polling of the object carrier microcontroller units 30 located in the individual cabinets 40*i*. In particular, microcontroller unit 52 is configured to place a polling request on communication links 55*i* in a periodic manner, preferably every second in the preferred implementation of the invention. In response to the polling request, each object carrier microcontroller unit 30 operationally located in each cabinet 40*i* responds with its identification and this information is stored in memory device 53 by microcontroller unit 52. Microcontroller unit 52 also compares the received identification information with the identification information previously stored in memory device 53. If any identification is missing from the received responses, microcontroller unit 52 erases this identification from memory device 53 and sends this result to host computer 60 to update the master system data base. If new identification information is included in the received responses (indicating, e.g., that a new key holder 15 has been added to the cabinet or a key holder 15 has been transferred to a different cabinet), microcontroller unit 52 enters this information into memory device 53 and sends this result to host computer 60 to update the master system data base.

Figure 5:
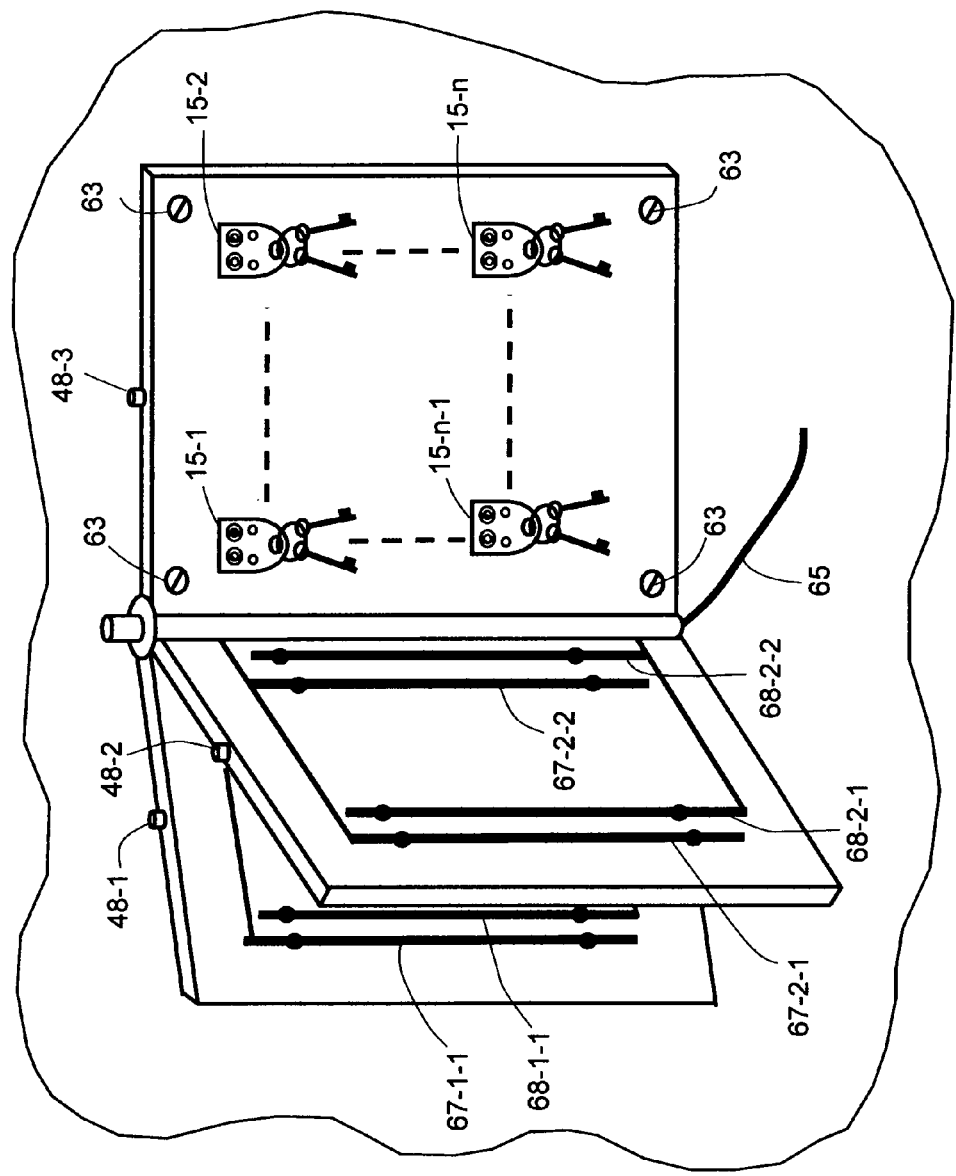
FIG. 5 is a perspective view of an alternate storage board having several leaves for removably storing several removably suspended objects of the type shown in FIG. 1.

Instead of removably storing the keys 10 and associated key holders 15 in one or more cabinets 40 as described above and illustrated in FIGS. 3 and 4, the storage board arrangement illustrated in FIG. 5 can be used. As seen in this Fig., a storage board having a plurality of storage leaves (three illustrated) are pivotally mounted together in book-like fashion. The rear-most leaf is attached to a mounting member (such as a wall) by means of fasteners 63, such as screws or bolts. Each leaf has a plurality of pairs of suspension members 21, 22 arranged in the same manner as in the embodiment of FIG. 3 for removably retaining key holders 15*i* to which individual keys 10 are permanently attached. A control, address and power signal cable is connected at one end to microcontroller unit 52 (not illustrated in FIG. 5) and at the other end to a plurality of conductive paths 67*i*, 68*i* formed on the reverse surface of each page. Each conductive path 67*i* is ohmically connected to a different suspension member 21*i*, while each conductive path 68*i* is ohmically connected to a different suspension member 22*i*. As with the FIG. 3 arrangement, the suspension members 21*i*, 22*i* extend outwardly from the front surface of each leaf to facilitate removable suspension of the key holders 15*i*. Each leaf is also furnished with a leaf visible indicator 48*i*, which functions in the same manner as the visible indicators 48*i* for cabinets 40*i* of FIG. 3.

Figure 6:
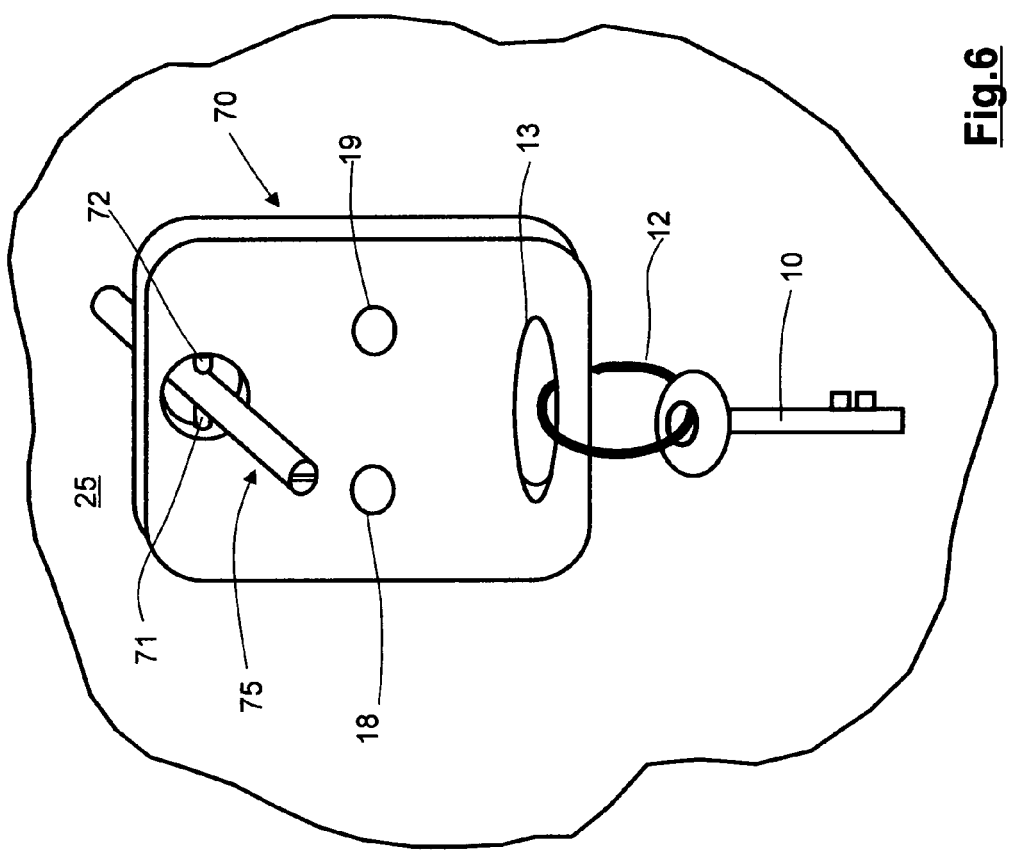
FIG. 6 is a perspective view of a second embodiment of a removably suspended object in the form of a key and a key holder object carrier removably suspended on a single round suspension member.
Figure 7:
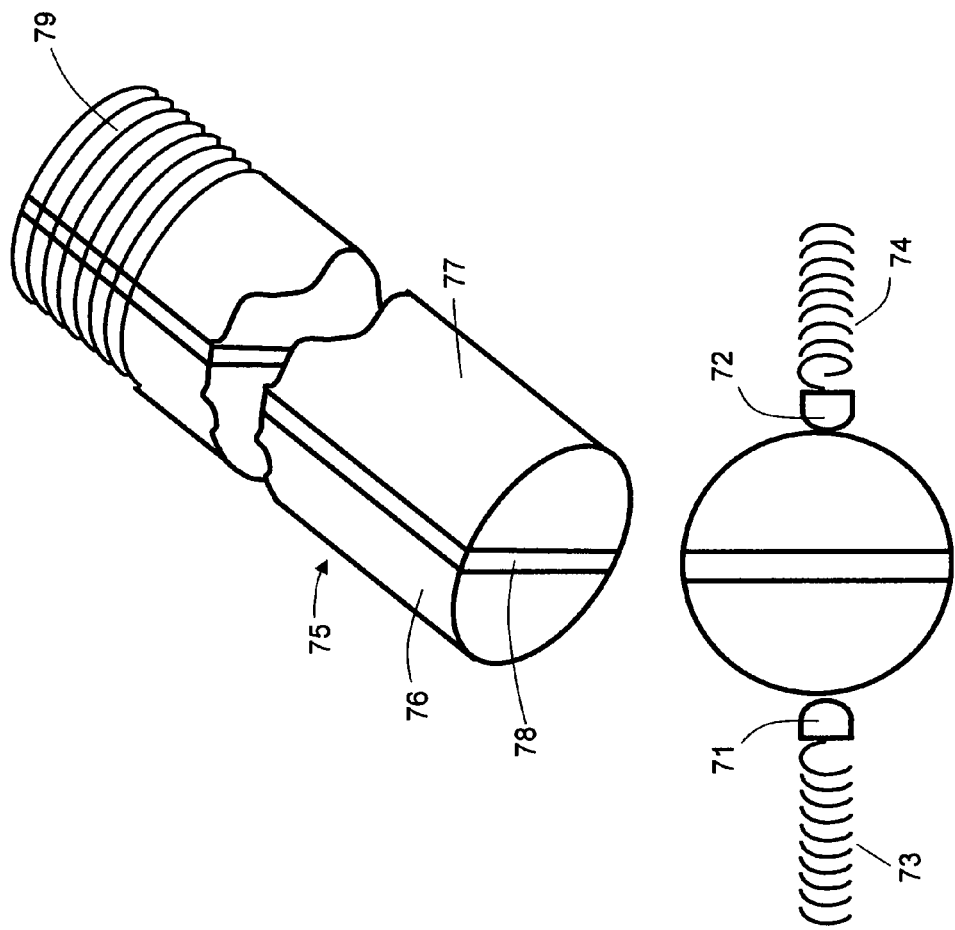
FIG. 7 is a composite schematic view of the single suspension member of the embodiment of FIG. 6.

In some applications of the invention it may be preferable to employ a single suspension member for each key holder 15. FIGS. 6 and 7 illustrate a first embodiment using a single essentially cylindrical suspension member generally designated with reference numeral 75. As seen in these Figs., a key holder 70 having a similar key ring aperture 13, and visible indicator apertures 18, 19 as the key holder 15 of FIGS. 1 and 2 is provided with a pair of oppositely disposed electrically conductive pins 71, 72 in a single aperture formed centrally of the upper housing region of key holder 70. Pins 71, 72 are biased inwardly by a pair of bias springs 73, 74. Suspension member 75 has two electrically conductive elements 76, 77 separated by an electrically insulative central spacer element 78. Elements 76, 77 provide electrical communication between microcontroller unit 52 and microcontroller unit 30 in the interior of key holder 70 in the same way as that described above for the embodiment of FIGS. 1-4. Spacer element 78 provides electrical insulation between electrically conductive elements 76, 77 which is necessary for the proper functioning of the system. To promote ohmic electrical connection between elements 76, 77 and microcontroller unit 30, pins 71, 72 are biased by springs 73, 74 against the outer surface of elements 76, 77. As shown in FIG. 7, the remote end 79 of suspension member 75 has an external thread to facilitate installation of suspension member 75 in an aperture formed in the mounting member, such as backboard 25 of FIG. 1. This is done by first threading a mounting nut onto the external thread, inserting end 79 into a mounting aperture, and threading a second mounting nut onto the external thread so that both nuts firmly engage opposite surfaces of the mounting member. Electrical connection to elements 76, 77 can be done in any suitable manner known to those of ordinary skill in the art, such as by soldering. The protruding end of suspension member 75 may be formed with an upward turn to promote retention of a key holder 70 thereon.

Figure 9:
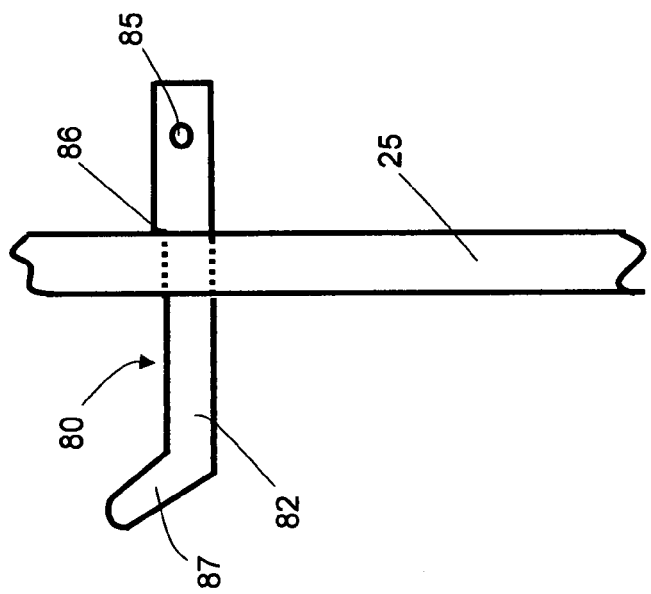
FIG. 9 is a side view illustrating the square suspension member mounted to the back wall of a cabinet.
Figure 8:
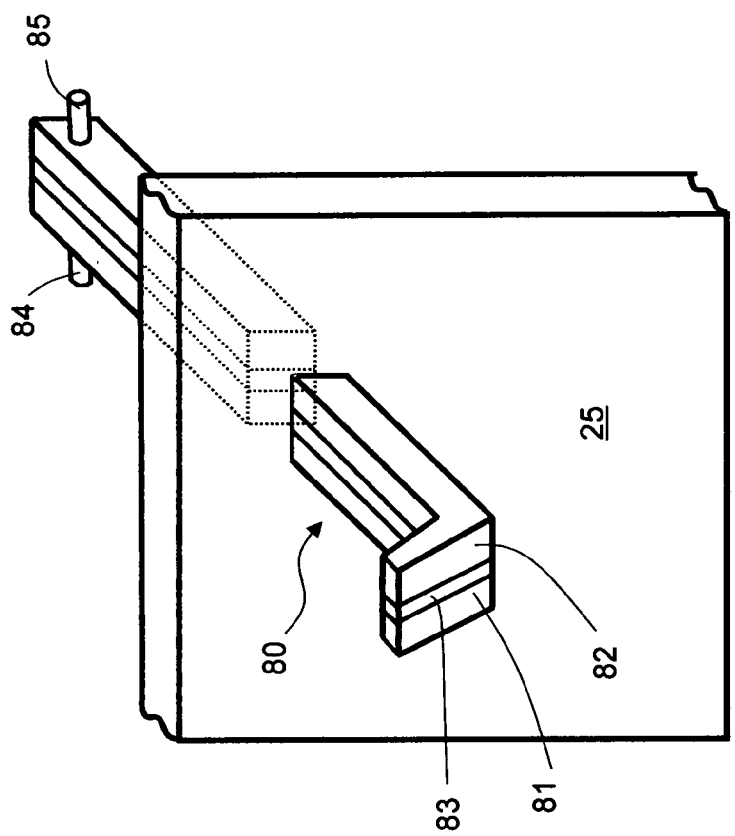
FIG. 8 is a perspective view of a third embodiment of a removably suspended object in the form of a key and a key holder object carrier removably suspended on a single square suspension member.

FIGS. 8 and 9 illustrate a second embodiment of a single suspension member using a suspension bar generally designated with reference numeral 80. As seen in these Figs., suspension bar 80 has two electrically conductive elements 81, 82 separated by an electrically insulative central spacer 83. Elements 81, 82 provide electrical communication between microcontroller unit 52 and microcontroller unit 30 in the interior of key holder 70 in the same way as that described above for the embodiment of FIGS. 1-4. Spacer element 83 provides electrical insulation between electrically conductive elements 81, 82 which is necessary for the proper functioning of the system. Since suspension bar 80 has a rectangular cross section, the single aperture formed centrally of the upper housing region of key holder 70 must have a complementary shape in order to accommodate suspension bar 80 when key holder 70 is removably supported thereby. As with the FIG. 7 embodiment, pins 71, 72 and bias springs 73, 74 provide effective electrical connection between suspension bar elements 81, 82 and microcontroller unit 30 in key holder 70. Electrical connection to suspension member elements 81, 82 may be effected in the same manner as that described above with reference to the first embodiment shown in FIG. 7. Alternatively elements 81, 82 may be equipped with electrically conductive contact studs 84, 85 mounted in apertures formed at the rear, to which electrical conductors may be secured by soldering or the like. To promote retention of suspension member 80 in the corresponding aperture in mounting back board 25, the rear portion of suspension bar 80 has an enlarged vertical dimension to provide an abutment notch 86 when suspension bar 80 is inserted into the mounting aperture in back board 25 from the rear. Lastly, the protruding end of suspension member 80 may be formed with an upward turn 87 to promote retention of a key holder 70 thereon.

Although the above description is devoted to an implementation of the invention in the field of key management systems, the invention has much wider application. In general, the invention can be used in any collective object management system in which the need exists for a technique for rapidly identifying a given class or type of object from a collection of objects which are designed to be removably suspended on one or more suspension members of the type shown and described above. For example, in a retail store operation, the objects may be individual mechantable items (such as dry cell batteries, hardware items, or the like) carried by a packaging unit designed to be removably attached to a suspension device and provided with identifying information for the item. In any application, the object carrier microcontroller 30 and LED indicator 34 associated to a specific object are closely coupled to the object itself and electrically coupled to the local microcontroller 52 so that the circuits can respond to the reception of a desired object address and activate the indicator 34 in such a way that a human operator can locate the object specified by the address.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. Moreover, while the indicator 48 has been described as a visible indicator, other types of indicators, such as audible indicators, may be used, if desired. Further, the invention may be used to manage a key system of many key cabinets positioned at different physical locations using an internal or an external computer network, if desired. In addition, while the embodiments described and illustrated in FIGS. 1 and 2 show only one key 10 attached to one key holder 15, in some implementations two or more keys 10 may be attached to a single holder 15 (as shown in FIGS. 3-5). Therefore, the above should not be construed as limiting the invention, which is defined by the appended claims.

What is claimed is:

1. An electronically addressable object carrier for enabling the management of objects distributed in an object location space, said object carrier comprising:
    a housing having an object retention element for securing an object to said object carrier and at least one through aperture for removably receiving an electrically conductive suspension member capable of manifesting object address signals and power signals supplied by a source;
    a microcontroller earned by said housing, said microcontroller having a unique object address serving to identify an object secured to said object carrier;
    an electrically conductive element located in said at least one aperture for electrically coupling said microcontroller to the electrically conductive suspension member when said aperture is removably received on the electrically conductive suspension member so that said object address signals and said power signals ace supplied to said microcontroller; and
    an indicator coupled to said microcontroller for activation whenever said microcontroller receives an address signal representative of said unique object address;
    wherein electrically conductive suspension member comprises a cylindrical or rectangular compound element having first and second electrically conductive portions and an electrically insulative central element interposed between said first and second electrically conductive portions.

2. The device of claim 1 wherein said indicator is a visible indicator.

3. The device of claim 2 wherein said visible indicator is an LED.

4. The device of claim 1 wherein said electrically conductive element comprises first and second electrically conductive members slidably and oppositely disposed in said at least one aperture and bias means for urging said first and second electrically conductive members toward each other so that said first and second electrically conductive members are urged into ohmic contact with an electrically conductive suspension member when said aperture is removably received on the electrically conductive suspension member.

5. The device of claim 4 wherein said bias means comprises a pair of springs each engaged with a different one of said first and second electrically conductive members.

6. The device of claim 1 wherein said housing has first and second mutually spaced through apertures for removably receiving first and second electrically conductive suspension members, at least one of said first and second electrically conductive suspension members being capable of manifesting object address signals and power signals supplied by a source; and wherein each of said first and second apertures is provided with an electrically conductive element located therein for electrically coupling said microcontroller to the first and second electrically conductive suspension members when said first and second mutually spaced apertures are removably received on the first and second electrically conductive suspension members.

7. The device of claim 6 wherein said electrically conductive element comprises a serrated washer.

8. The device of claim 1 wherein said object retention element includes an additional through aperture formed in said housing.

9. The device of claim 1 further including an additional indicator coupled to said microcontroller for activation whenever said microcontroller receives power signals.

10. A system for managing objects distributed in an object location space, said system comprising:
    a support element having a plurality of electrically conductive suspension members capable of manifesting object address signals and power signals supplied by a source; and
    a plurality of electronically addressable object carriers, each object carrier comprising a housing having an object retention element for securing an object to said object carrier and at least one through aperture for removably receiving a different one of said electrically conductive suspension members;
    a microcontroller carried by said housing, said microcontroller having a unique object address serving to identify an object secured to said object carrier;
    an electrically conductive element located in said at least one aperture for electrically coupling said microcontroller to the associated electrically conductive suspension member when said aperture is removably received on the associated electrically conductive suspension member so that said object address signals and said power signals are supplied to said microcontroller; and
    an indicator coupled to said microcontroller for activation whenever said microcontroller receives an address signal from said associated electrically conductive suspension member representative of said unique object address;

wherein at least some of said plurality of electrically conductive suspension members comprises a cylindrical or rectangular compound element having first and second electrically conductive portions and an electrically insulative central element interposed between said first and second electrically conductive portions.

11. The system of claim 10 wherein said support element comprises a back board.

12. The system of claim 11 wherein said back board is part of a cabinet for removably storing said plurality of electronically addressable object carriers.

13. The system of claim 10 wherein said electrically conductive element comprises first and second electrically conductive members slidably and oppositely disposed in said at least one aperture and bias means for urging said first and second electrically conductive members toward each other so that said first and second electrically conductive members are urged into ohmic contact with the associated electrically conductive suspension member when said aperture is removably received on the associated electrically conductive suspension member.

14. The system of claim 13 wherein said bias means comprises a pair of springs each engaged with a different one of said first and second electrically conductive members.

15. The system of claim 10 wherein said housing has first and second mutually spaced through apertures for removably receiving first and second associated electrically conductive suspension members, at least one of said associated first and second electrically conductive suspension members being capable of manifesting object address signals and power signals supplied by a source; and wherein each of said first and second apertures is provided with an electrically conductive element located therein for electrically coupling said microcontroller to said associated first and second electrically conductive suspension members when said first and second mutually spaced apertures are removably received on said associated first and second electrically conductive suspension members.

16. The system of claim 15 wherein said electrically conductive element comprises a serrated washer.

17. The system of claim 10 wherein said object retention element includes an additional through aperture formed in said housing.

18. The system of claim 10 further including an additional indicator coupled to said microcontroller for activation whenever said microcontroller receives power signals.

* * * * *

UNITED STATES PATENT AND TRADEMARK OFFICE
CERTIFICATE OF CORRECTION

PATENT NO. : 9,875,460 B2
APPLICATION NO. : 14/999010
DATED : January 23, 2018
INVENTOR(S) : Zhu et al.

It is certified that error appears in the above-identified patent and that said Letters Patent is hereby corrected as shown below:

On the Title Page

Item (54) change "SUSTENDED" to --SUSPENDED--
Item (73) Assignee change "ZMICRODATA CORPORATION" to --iMicrodata Corporation--

Signed and Sealed this
Fourteenth Day of August, 2018

Andrei Iancu
*Director of the United States Patent and Trademark Office*